United States Patent [19]

Satake

[11] Patent Number: 5,093,733
[45] Date of Patent: Mar. 3, 1992

[54] IMAGE SIGNAL PROCESSING DEVICE

[75] Inventor: Yoshiaki Satake, Ebina, Japan

[73] Assignee: Ricoh Company, Ltd., Tokyo, Japan

[21] Appl. No.: 360,075

[22] Filed: Jun. 1, 1989

[30] Foreign Application Priority Data

Jun. 2, 1988 [JP] Japan .............................. 63-74161[U]

[51] Int. Cl.$^5$ ............................................... H04N 1/40
[52] U.S. Cl. ................................... 358/455; 358/443; 358/448
[58] Field of Search ............... 358/455, 456, 457, 458, 358/461, 465, 466, 474, 443, 448; 341/110, 154

[56] References Cited

U.S. PATENT DOCUMENTS

| | | | |
|---|---|---|---|
| 4,578,715 | 3/1986 | Yamaguchi | 358/457 |
| 4,591,826 | 5/1986 | Seiler | 341/154 |
| 4,847,695 | 7/1989 | Arai | 358/455 |

FOREIGN PATENT DOCUMENTS 55-134574  10/1980  Japan .................. 358/465

Primary Examiner—Edward L. Coles, Sr.
Assistant Examiner—Thomas D. Lee
Attorney, Agent, or Firm—Oblon, Spivak, McClelland, Maier & Neustadt

[57] ABSTRACT

An image signal processing device includes an A/D converter which detects a white peak level of an analog image signal corresponding to the intensity of light obtained by an optical scan and for outputting a corresponding digital signal including a plurality of bits. A storage circuit stores the digital signal corresponding to the detected white peak level in digital form. A D/A converter converts the digital signal read out of the storage circuit into an analog signal. A voltage divider generates a reference voltage from the analog signal supplied from the D/A converter. A comparator compares the analog image signal with the reference voltage supplied from the voltage divider to thereby generate a digital image signal corresponding to the analog image signal.

14 Claims, 4 Drawing Sheets

IMAGE SIGNAL PROCESSING DEVICE

BACKGROUND OF THE INVENTION

The present invention generally relates to an image signal processing device, and particularly to the setting of a reference which is used when an analog image signal is quantized to generate a digital image signal. The present invention is suitable for an image reading apparatus such as a scanner and a facsimile machine.

Currently, an image reading apparatus such as a scanner and a facsimile machine is widely used. In such an apparatus, an analog image signal is generated from a light reflected on a document and is then converted into binary-valued or multi-valued image data.

FIG. 1 is a schematic block diagram of a conventional image processing device provided in a scanner. Referring to FIG. 1, a scanner 1 includes a line image sensor 2, an amplifier 3, a white peak level holding circuit 4, a timing circuit 5, a driving circuit 6, a voltage dividing circuit 7, and a comparator 8. The line image sensor 2 has a full-size charge coupled device (hereinafter simply referred to as a CCD device) amounting to one line, and divides an electrical signal corresponding to a light reflected on a document into parts for every pixel. The divided signals form an analog image signal and is supplied to the amplifier 3. The line image sensor 2 is driven by the driving circuit 6. The read timing is defined for every pixel by a timing signal derived from the timing circuit 5.

The amplifier 3 amplifies the image signal supplied from the line image sensor 2, and supplies the white peak level holding circuit 4 and the comparator 8 with an amplified image signal. The white peak level holding circuit 4 operates in synchronism to the timing signal supplied from the timing circuit 5, and holds a peak level of an image signal obtained when reading a white press plate used for supporting a document set on a contact glass of the scanner.

Referring to FIG. 2, there is illustrated an example of the structure for the white peak level holding circuit 4. As is illustrated, the white peak level holding circuit 4 includes amplifiers 11 and 12, a diode 13, a transistor 14, a capacitor 15, and resistors 16 and 17. The transistor 14 is supplied with a timing signal for reset (a reset signal), which is derived from the timing circuit 5. The white peak level holding circuit 4 is reset before the white press plate is read. Thereafter, the image signal supplied from the line image sensor 2 through the amplifier 3 is applied to the amplifier 11. Then, the peak level obtained when a white pixel is read, that is, a peak voltage level is held during a time depending on the time constant defined by the capacitor 15 and the resistor 16. Generally, it is very difficult to hold the peak level for a long time. Normally, the holding time is set to a reading time it takes to read a few lines to one page of a document. It is noted that when the holding time is set equal to a reading time equal to a few lines, it is necessary to hold the white peak level again by utilizing a background portion of the document.

The white peak level held by the white peak level holding circuit is voltage-divided by the voltage dividing circuit 7, which thereby outputs a reference value to be compared in the comparator 8 with the image signal supplied from the amplifier 3. The comparator 8 determines whether the divided image signal is white or black, and outputs binary-valued data based on the comparison results.

In case where a halftone processing is carried out, the voltage dividing circuit 7 generates a plurality of reference values (dither value) arranged in a matrix form on the basis of the white peak level supplied from the white peak level holding circuit 4. Then the comparator 8 compares the image signal with the plurality of reference values, and outputs binary valued data indicating white or black for every pixel.

However, the aforementioned conventional image signal processing device presents the following disadvantages. Since the white peak level is held in the form of an analog signal, the white peak level varies with time and thereby the quality of reproduced images is deteriorated. That is, as shown in FIG. 3(b), the held white peak level gradually decreases, because the white peak level is held during the holding time based on the time constant of the capacitor 15 and the resistor 16. As a result, the reference value determined by dividing the white peak level also decreases as indicated by a broken line shown in FIG. 3(a). This affects the white/black discrimination and causes errors in the discrimination results. It follows that the image quality is deteriorated.

Particularly, in a facsimile machine, the scanner of the transmitter must be stopped for a long time when transmission errors are caused due to a fault occurring in a transmission line and image data is being retransmitted. Also, in transmission of halftone image data, the scanner is required to be stopped for a long time, because the efficiency of data compression is poor. In the above-mentioned cases, the held white peak level decreases during the time when the scanner is stopped. As a result, the held white peak level decreases stepwise as shown in FIG. 3(c). The above decrease of the held white peak level causes an abrupt decrease of the reference value to be compared with the image signal supplied from the amplifier 3. The decrease of the reference value deteriorates the quality of reproduced images.

SUMMARY OF THE INVENTION

It is therefore a general object of the present invention to provide an improved image signal processing device in which the aforementioned disadvantages of the conventional device are eliminated.

A more specific object of the present invention is to provide an image signal processing device which has no time deterioration of the white peak level used for quantization and can improve the quality of reproduced images.

The above objects of the present invention can also be achieved by an image signal processing device comprising first means for detecting a white peak level of an analog image signal corresponding to the intensity of light obtained by an optical scan and for outputting a corresponding digital signal including a plurality of bits; second means for storing said digital signal corresponding to said detected white peak level in digital form; third means for converting said digital signal read out of said second means into an analog signal; fourth means for generating a reference voltage from said analog signal supplied from said third means; and fifth means for comparing said analog image signal with said reference voltage supplied from said fourth means to thereby generate a digital image signal corresponding to said analog image signal.

Other objects, features and advantages of the present invention will become apparent from the following

DESCRIPTION OF THE PREFERRED EMBODIMENT

Figure 4:
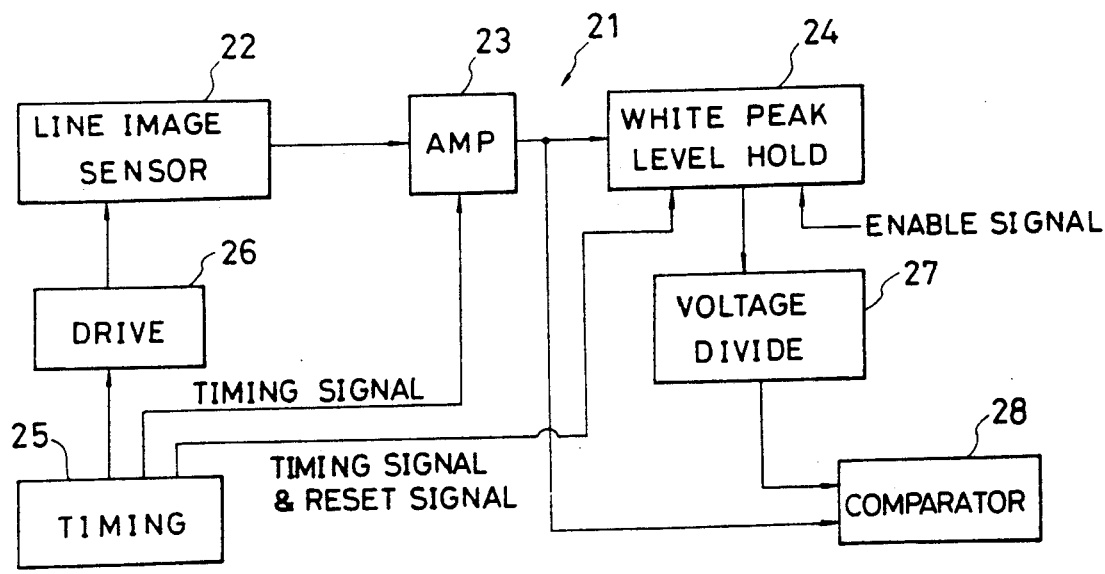
FIG. 4 is a schematic block diagram of a preferred embodiment of the present invention.
Figure 5:
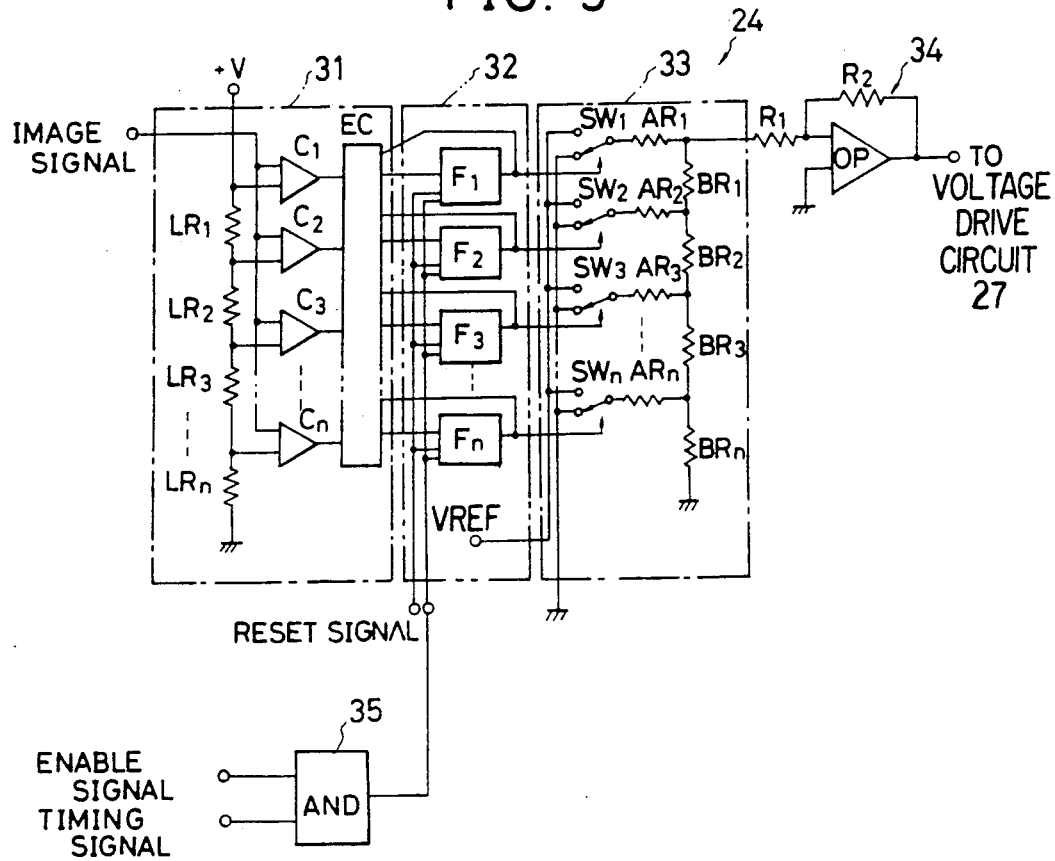
FIG. 5 is a circuit diagram of a white peak level holding circuit used in the configuration shown in FIG. 4.

A description is given of a preferred embodiment of the present invention with reference to FIGS. 4 and 5.

Referring to FIG. 4, an image signal processing device 21 includes an amplifier 23 connected to a line image sensor 22, a white peak level holding circuit 24, a timing circuit 25, a driving circuit 26, a voltage dividing circuit 27, and a comparator 28. The line image sensor 22 outputs an image signal corresponding to the intensity of light received by the line image sensor 22. The image signal is supplied to the amplifier 23, and the amplified image signal is fed to the white peak level holding circuit 24 and the comparator 28. The white peak level holding circuit 24 operates based on a timing signal supplied from the timing circuit 25, and holds the white peak level of the image signal supplied from the amplifier 23.

Referring to FIG. 5, there is illustrated an example of the structure for the white peak level holding circuit 24. As shown, the white peak level holding circuit 24 includes an analog-to-digital converter (hereinafter simply referred to as an A/D converter) 31, a storage circuit 32, a digital-to-analog converter (hereinafter simply referred to as a D/A converter) 33, an amplifier 34 and an AND circuit 35.

The A/D converter 31 includes a plurality of comparators C1 through Cn, resistors LR1 through LRn, and an encoder EC. The comparators C1 through Cn are supplied with the image signal supplied from the amplifier 23, and corresponding reference voltages obtained by dividing a positive constant voltage V by a resistor network consisting of resistors LR1 through LRn connected in series. Each of the comparators C1 through Cn compares the voltage of the supplied image signal and the related reference voltage, and outputs the comparison result. The encoder EC receives the comparison results derived from the comparators C1 through Cn, and outputs corresponding coded data to the storage circuit 32.

The storage circuit 32 is made up of a plurality of flip-flops F1 through Fn, which store the corresponding coded data supplied from the encoder EC. That is, in the A/D converter 31, the image signal supplied from the amplifier 23 is converted into a digital value corresponding to the magnitude of the image signal by the comparators C1 through Cn, and the digital value is converted into the coded data by the encoder EC. The coded data is read out of the storage circuit 32, and supplied to the D/A converter 33. Additionally, the coded data is also fed back to the encoder EC.

Figure 6:
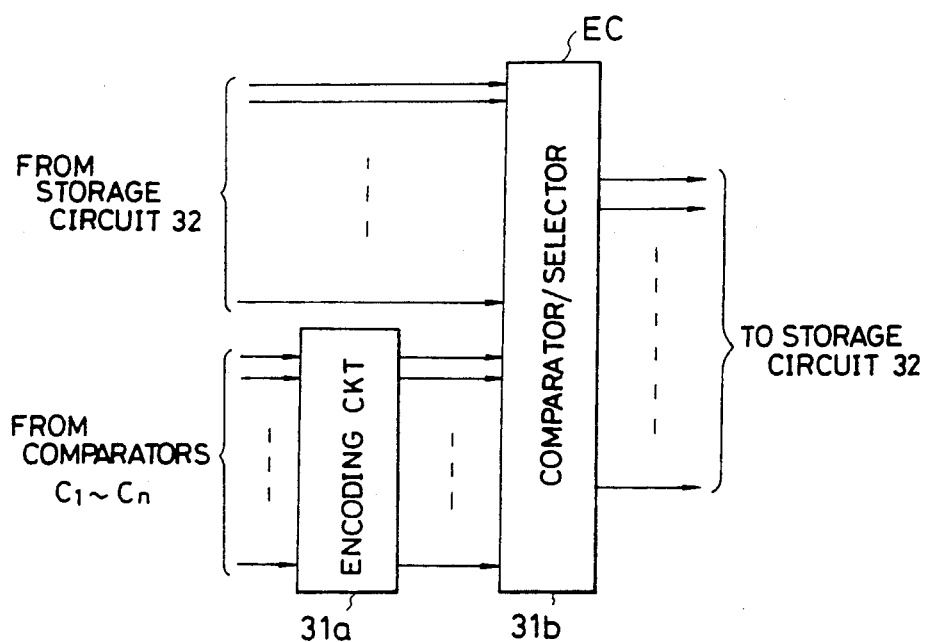
FIG. 6 is a block diagram of an encoder used in the configuration shown in FIG. 5.

FIG. 6 is a block diagram of the encoder EC. As is illustrated, the encoder EC includes an encoding circuit 31a and a comparator/selector 31b. The encoding circuit 31a converts the image signal supplied from the comparators C1 through Cn into the coded data. The coded data is supplied to the comparator/selector 31b, which is also supplied with the coded data fed back from the storage circuit 32. The comparator/selector 31b compares the coded data supplied from the encoding circuit 31a with the coded data supplied from the storage circuit 32. Then the comparator 31b selects one of the two coded data which represents a value equal or larger than that represented by the other coded data. In this manner, the white peak level is stored in the storage circuit 32.

The D/A converter 33 includes switches SW1 through SWn, resistors AR1 through ARn, and BR1 through BRn. Each of the switches SW1 through SWn has a first contact supplied with a reference voltage $V_{REF}$ and a second contact supplied with a ground potential. The switches SW1 through SWn select either the reference voltage $V_{REF}$ or the ground potential, depending on the coded data supplied from the flip-flops F1 through Fn, respectively. The potential signals selected by the switches SW1 through SWn are applied to a resistor network consisting of the resistors AR1 through ARn, and BR1 through BRn. The resistors BR1 through BRn are connected in series. The resistor BRn is connected to ground, and the node of the resistors AR1 and BR1 is served as an output terminal of the resistor network. An analog signal corresponding to the output signal of the storage circuit 32 is extracted from the node.

The amplifier 34 is connected to the above-mentioned node of the resistors AR1 and BR1. The amplifier 34 includes resistors R1, R2 and an operational amplifier OP, and amplifies the analog signal supplied from the D/A converter 33. The amplified signal is supplied to the voltage dividing circuit 27 shown in FIG. 4.

The AND circuit shown in FIG. 5 is supplied with the aforementioned timing signal supplied from the timing circuit 25 (FIG. 4) and an enable signal supplied from a control circuit (not shown) provided in an image processing apparatus such as a scanner and a facsimile. The timing signal indicates a timing with which the image data supplied from the amplifier 23 is read for every pixel. The enable signal is turned ON (or switched to a high level) when setting the white peak level.

Figure 7:
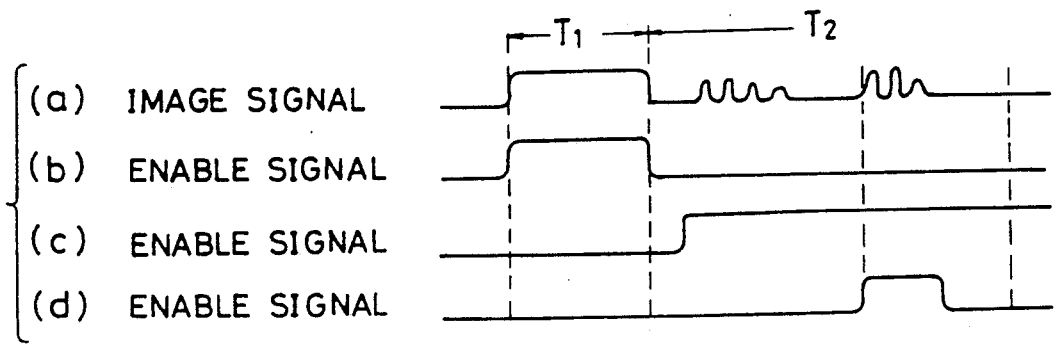
FIG. 7 is a waveform diagram of an image signal and a variety of enable signals.

It is possible to select a variety of timings with which the setting of the white peak level is executed, as shown in FIG. 7. FIG. 7(a) illustrates a waveform of the image signal supplied from the amplifier 23. During time T1, the white press plate provided in the apparatus is read. At time T2, the reading of a document is started. In FIG. 7(b), the enable signal is ON during time T1. In FIG. 7(c), the enable signal is ON during the time when the document is read. In FIG. 7(d), the enable signal is ON during a predetermined period of time corresponding to a front blank portion of the document.

Turning to FIG. 5, the AND circuit 35 supplies the flip-flops F1 through Fn with the timing signal only when the enable signal is ON. At this time, the contents of the flip-flops F1 through Fn are revised with the coded data supplied from the encoder EC.

A description is given of an operation executed when the white press plate is read, and the white peak level is extracted from the read image signal and stored in the storage circuit 32 prior to the reading of a document.

First, the flip-flops F1 through Fn are reset by a reset signal supplied from the timing circuit 5, and thereafter the reading of the white press plate is started. Light reflected on the white press plate is converted into an image signal in analog form by the line image sensor 22. The converted image signal is a signal formed for every pixel. The image signal is amplified by the amplifier 23 and is sequentially supplied to the white peak level holding circuit 24. The A/D converter 31 of the white peak level holding circuit 24 converts the received image signal into the corresponding digital image data, and then generates the corresponding coded data. The coded data is supplied to and stored in the storage circuit 32. The coded data is stored in the storage circuit 32 for every pixel. The coded data formed for every pixel is converted into the corresponding analog signal by the D/A converter 33. At this time, the coded data is fed back to the encoder EC of the A/D converter 31. As described previously, the encoder EC outputs larger one of the coded data supplied from the comparators C1 through Cn and the flip-flops F1 through Fn. Therefore, D/A converter 33 outputs the white peak level (highest level) obtained during the time when the white press plate is read. As a result, the white peak level does not vary with time after the reading of the white press plate.

At the time of reading a document, the content of the storage circuit 32, that is, the held white peak level is supplied to the voltage dividing circuit 27 through the D/A converter 33 and the amplifier 34. The voltage dividing circuit 27 divides the supplied white peak level to generate the reference value (or values) to be compared with the image signal supplied from the amplifier 23. The comparator 28 compares the image signal supplied from the amplifier 28 with the reference value supplied from the voltage dividing circuit 27, and outputs binary-valued data indicating whether the image is white or black for every pixel. The digital image data thus formed is supplied to the following stage, and is subjected to processing for printing, transmission and so on.

Figure 1:
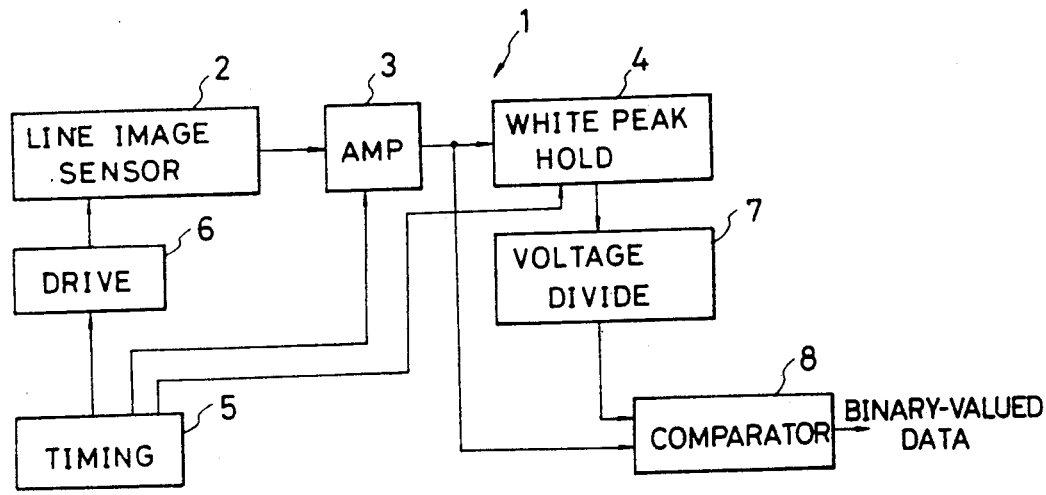
FIG. 1 is a schematic block diagram of a conventional image signal processing device provided as a part of a scanner.
Figure 2:
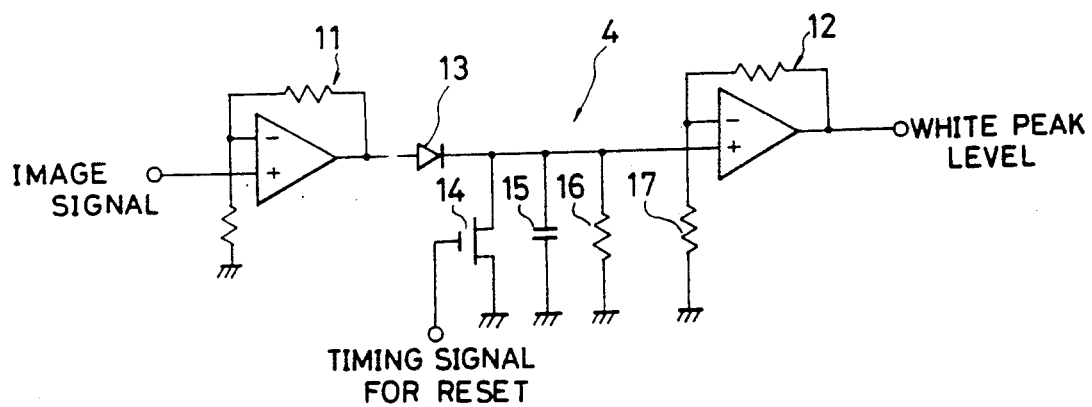
FIG. 2 is a circuit diagram of a white peak level holding circuit used in the configuration of FIG. 1.
Figure 3:
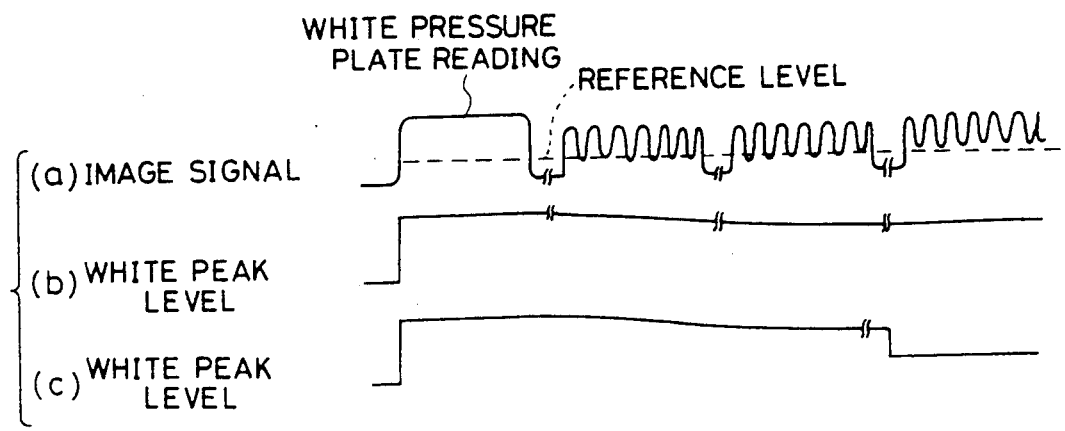
FIG. 3 is a waveform diagram of an image signal and white peak signals appearing in the configuration of FIG. 1.

It is noted that the white peak level supplied from the white peak level holding circuit 24 is generated by subjecting the white peak value stored in the storage circuit as digital data to the digital-to-analog conversion by the D/A converter 33. Therefore, the white peak level supplied from the white peak level holding circuit 24 does not change with time. It follows that the reference value generated by the voltage dividing circuit 27 is stabilized and high-quality image can be reproduced. It is noted that the white peak level generated by the white peak level holding circuit 4 shown in FIG. 1 varies with time due to discharge or the like.

Particularly, the present invention is suitably applicable to a facsimile machine. That is, the white peak level is held as it is, even when the scanner is stopped for a long time due to the occurrence of a line fault and the retransmission of image data is being retransmitted during the above time. As a result, the density variation does not occur and high-quality images can be reproduced.

Figure 8:
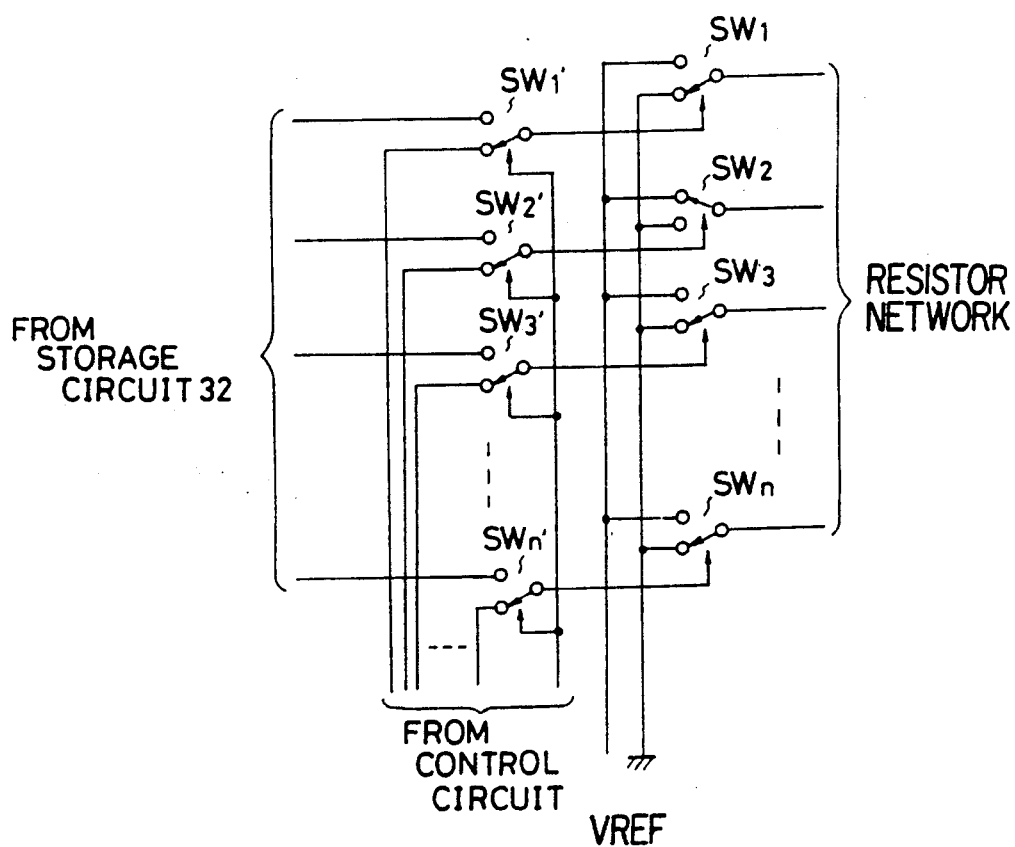
FIG. 8 is a block diagram of a variation of used in the configuration of FIG. 5.

Referring to FIG. 8, there is illustrated a variation of the encoder EC shown in FIG. 5. In FIG. 8, the resistor network consisting of the resistors AR1 through ARn and BR1 through BRn is omitted for the sake of simplicity. The illustrated variation enables it to be possible to select a desired white peak level. Switches SW1' through SWn' have first and second contacts. The first contacts of the switches SW1' through SWn' are connected to the flip-flops F1 through Fn, respectively. The second contacts of the switches SW1' through SWn' are supplied with related bits of a desired white peak level supplied from the control circuit (not shown) provided in an image processing apparatus such as a scanner and a facsimile machine. The switches SW1' through SWn' are supplied with a switch control signal supplied from the control circuit. When the setting of the desired white peak level is carried out, the switch control signal makes the switches SW1' through SWn' select the desired white peak level supplied from the control circuit. The bits of the desired white peak level selected by the switches SW1' through SWn' control the switches SW1 through SWn. Then, each of the switches SW1 through SWn selects either the reference voltage $V_{REF}$ or the ground level, depending on the potential signals of the switches SW1' through SWn', respectively.

According to the above-mentioned variation, it becomes possible to select a white peak level almost identical to the white peak level obtained by reading the white press plate, even if the background of a document to be read is not white but gray, for example.

The present invention is not limited to the aforementioned embodiment, and variations and modifications may be made without departing from the scope of the invention.

What is claimed is:
1. An image signal processing device comprising:
first means for detecting a white peak level of an analog image signal corresponding to an intensity of light obtained by an optical scan and for outputting a corresponding digital signal including a plurality of bits;
second means for storing said digital signal corresponding to said detected white peak level in digital form;
third means for converting said digital signal read out of said second means into an analog signal and for amplifying said analog signal;
fourth means for generating a reference voltage from said amplified analog signal supplied from said third means; and
fifth means for comparing said analog image signal with said reference voltage supplied from said fourth means to thereby generate a digital image signal corresponding to said analog image signal;
wherein said first means comprises generating means for generating a plurality of different comparison reference voltages, comparator means for comparing said analog image signal with said plurality of comparison reference voltages supplied from said generating means and for outputting a comparison result for every comparison reference voltage, encoder means for generating coded data from the comparison results supplied from the comparator means, and selecting means for comparing the coded data being processed with previous coded data and for selecting a larger one of said coded data being processed and said previous coded data, and wherein said selected coded data is said digital signal to be supplied to said second means.

2. An image signal processing device as claimed in claim 1, wherein said selecting means receives said previous coded data fed back from said second means.

3. An image signal processing device as claimed in claim 1, wherein said storage means includes a plurality of flip-flops storing said bits of said digital signal.

4. An image signal processing device as claimed in claim 1, wherein said storage means stores said digital signal during a predetermined period of time.

5. An image signal processing device as claimed in claim 4, wherein said storage means stores said digital signal during a time necessary to determine said white peak level.

6. An image signal processing device as claimed in claim 1, wherein said generating means includes a plurality of resistors connected in series and said plurality of comparison reference voltages are extracted from nodes of neighboring resistors out of said plurality of resistors.

7. An image signal processing device as claimed in claim 1, wherein said third means comprises switching means for selecting one of first and second predetermined voltage signals for each of the bits of said digital signal, on the basis of the white peak level stored in said second means, analog signal generating means for generating said analog signal, depending on said first and second predetermined voltage signals selectively supplied from said switching means for every bit, and amplifier means for amplifying said analog signal and for outputting an amplified analog signal supplied to said fourth means.

8. An image signal processing device as claimed in claim 7, wherein said first predetermined voltage is a positive voltage, and said second predetermined voltage is a ground level.

9. An image signal processing device as claimed in claim 7, wherein said analog signal generating means includes a resistor network consisting of a plurality of resistors.

10. An image signal processing device as claimed in claim 1, wherein said second means is supplied with an enable signal from an external circuit, and is activated during the time when said enable signal is supplied thereto.

11. An image signal processing device as claimed in claim 10, wherein said enable signal is supplied to said second means before an analog image signal obtained by optically reading a document is supplied to said first means.

12. An image signal processing device as claimed in claim 10, wherein said enable signal is supplied to said second means during a time when an analog image signal obtained by optically reading a document is supplied to said first means.

13. An image signal processing device as claimed in claim 10, wherein said enable signal is supplied to said second means when an image signal corresponding to a front plank portion of a document is supplied to said first means.

14. An image processing device comprising:
first means for detecting a white peak level of an analog image signal corresponding to an intensity of light obtained by an optical scan and for outputting a corresponding digital signal including a plurality of bits;
second means for storing said digital signal corresponding to said detected white peak level in digital form;
white peak level switching means, connected to said second means, for selectively providing one of said stored digital signal corresponding to said detected white peak level and another digital signal corresponding to a desired white peak level supplied from an external circuit;
third means for converting said selected digital signal into an analog signal and for amplifying said analog signal;
fourth means for generating a reference voltage from said amplified analog signal supplied from said third means; and
fifth means for comparing said analog image signal with said reference voltage supplied from said fourth means to thereby generate a digital image signal corresponding to said analog image signal.

* * * * *